United States Patent
Lecheler et al.

(10) Patent No.: US 7,274,578 B2
(45) Date of Patent: Sep. 25, 2007

(54) CONVERTER CIRCUIT HAVING CLASS E CONVERTER MODULES

(75) Inventors: Reinhard Lecheler, Neuburg/Donau (DE); Wolfram Sowa, Munich (DE)

(73) Assignee: Patent-Treuhand-Gesellschaft fur Elektrisch Gluhlampen mbH, Munich (DE)

( * ) Notice: Subject to any disclaimer, the term of this patent is extended or adjusted under 35 U.S.C. 154(b) by 161 days.

(21) Appl. No.: 11/226,378

(22) Filed: Sep. 15, 2005

(65) Prior Publication Data

US 2006/0076903 A1    Apr. 13, 2006

(30) Foreign Application Priority Data

Sep. 29, 2004   (DE)  ................... 10 2004 047 372

(51) Int. Cl.
*H02M 7/537*    (2006.01)
(52) U.S. Cl. ........................ 363/71; 363/131
(58) Field of Classification Search ............. 323/20, 323/21.01, 21.04, 21.12, 71, 72, 131
See application file for complete search history.

(56) References Cited

U.S. PATENT DOCUMENTS

| | | | | |
|---|---|---|---|---|
| 4,814,963 A | * | 3/1989 | Petersen | 363/20 |
| 5,365,421 A | * | 11/1994 | Eastman | 363/71 |
| 6,323,600 B1 | | 11/2001 | Statnic et al. | 315/209 R |

FOREIGN PATENT DOCUMENTS

WO    WO 99/05892    2/1999

OTHER PUBLICATIONS

C.H. Sturm, E Klein "Betriebsgerate und Schaltungen fur elektrische Lampen", 6. Auflage, 1992, Siemens AG, S. 127.

* cited by examiner

*Primary Examiner*—Jeffrey Sterrett
(74) *Attorney, Agent, or Firm*—Carlo S. Bessone

(57) ABSTRACT

The invention relates to a converter circuit having a series circuit of class E converter modules for optimizing the DC supply voltage of the individual converter module (for example C7, C11, Z1, S1, L1, L2).

18 Claims, 3 Drawing Sheets

US 7,274,578 B2

CONVERTER CIRCUIT HAVING CLASS E CONVERTER MODULES

TECHNICAL FIELD

The present invention relates to a converter circuit, in particular to an electronic ballast having this converter circuit, to corresponding operating methods and, within the framework of preferred applications, to a lamp system and the use of such a lamp system.

BACKGROUND ART

Converter circuits for producing an AC voltage power from a rectified line supply or a DC voltage supply are known per se in various designs. So-called class E converters or flyback converters are known, in particular.

In class E converters, storage inductors are charged by means of a terminal to a power supply. Given a specific current value, the current flow through a switching transistor lying in series with the storage inductor is interrupted, and the induced voltage pulse thereby produced is used to supply a load.

It is known, in particular, to use such class E converters to supply dielectrically impeded discharge lamps with a pulsed high-frequency supply voltage. Reference is made to U.S. Pat. No. 6,323,600 B1, which illustrates both the operating principle of a class E converter and this application.

It is further known to use power factor correction circuits in order to ensure that current is drawn from a supply network as sinusoidally as possible, that is to say in order to improve the power factor. Consideration is given here, inter alia, to so-called step-up converters, which are described, for example, in: C. H. Sturm, E. Klein: "Betriebsgeräte und Schaltungen für elektrische Lampen" ["Operating devices and circuits for electric lamps"], 6th edition, 1992, Siemens AG, page 127.

The step-up converter has the advantage of being particularly simple in design and operation.

DISCLOSURE OF THE INVENTION

The invention is based on the technical problem of specifying a converter circuit that is well-suited for use with an upstream power factor correction circuit.

The invention relates to a converter circuit having a plurality of class E converter modules whose switching transistors and storage inductors are connected in series overall and whose switching transistors can be driven by a common control signal.

The invention also relates to a corresponding ballast, in particular one having a power factor correction circuit and in the case of which the converter circuit can be operated with the unreduced output voltage of the power factor correction circuit.

In addition, the invention is also directed to appropriate operating methods as claimed in claim 12 and 13, to a lamp system as claimed in claim 14 and, within the framework of preferred applications, to uses of the lamp system as claimed in claim 15 and a display device as claimed in claim 16.

Furthermore, preferred refinements of the invention are specified in the dependent claims and explained in more detail below. The individual features always relate in this case both to the device category and to the method category of the invention, and to the various aspects of the invention enumerated above.

The basic idea of the invention consists in understanding a class E converter not as a converter circuit in itself, but as a module of a converter circuit. According to the invention, such class E converter modules are connected in series in such a way that their storage inductors and switching transistors, which are connected in series inside the modules in any case, form a series circuit overall. The switching transistors of the individual class E converter modules are driven by a common control signal such that the individual modules can operate in a fashion that is synchronized and at least substantially in phase. The switching transistors used to switch the current of the storage inductors on and off are thus switched synchronously, something which is done by using signaling technology to couple the control lines driving the individual switching transistors so as to obtain a common control signal.

This has the advantage that the series circuit of the modules can be used, as it were, as a voltage divider switch which divides the DC supply voltage over the individual modules such that a reduced DC supply voltage is present at the individual modules. In particular, the DC levels of the individual modules are added up, and this will be explained in more detail with the aid of the exemplary embodiments.

The result of this is a further degree of freedom of being able to use a relatively high DC supply voltage without having to match the individual class E converter thereto. This relates both to the loadability of the switching transistors as well as other components, but also chiefly to the design of the transformer at the output of the converter.

Rather, it is possible with the aid of the invention, on the one hand, to use relatively high DC supply voltages, and on the other hand to optimize the converter topology inside the module independently thereof, above all with regard to efficiency. It can then be determined thereupon how many serially connected modules can be used to fulfill the requirements overall.

A substantial aspect of the invention resides in the fact that it is frequently intended to use power factor correction circuits in the case of which the selection of the output voltage is not always free. For example, the step-up converters already mentioned at the beginning are not capable of generating output voltages below the peak value of the line voltage, but are favorable for other reasons. For example, a further step-down converter has already been used at the output of such a step-up converter in order to bring the DC supply voltage actually already existing to a voltage level favorable for the converter. This complication is eliminated by the invention. Rather, the converter circuit according to the invention can be used directly at the output of a step-up converter, directly signifying that there is no need to match voltage levels.

The abovementioned coupling of the individual control lines of the switching transistors in the modules with the aid of signaling technology is preferably performed via capacitors. The DC voltage separation of the capacitors has the advantage that the different potential levels of the modules do not cause interference, that is to say a common driver circuit can be used instead of individual driver circuits matched to the respective potentials.

It is also preferred to make use within each module of a zener diode that is situated in principle between the control terminal and the reference potential terminal of the switching transistor, that is to say between the gate terminal and the source terminal in the case of an FET in common source connection. The term reference potential terminal is to be understood in this case in the framework of the series circuit, that is to say can mean a reference potential raised by the DC voltage amplitudes of the modules situated "therebelow". It is, so to say, the reference potential from the point of view of the individual module that is important. This zener diode limits the voltage level at the control terminal and serves, in connection with the abovementioned coupling capacitors of the control lines, for adjusting the DC voltage level thereof. Furthermore, given a suitable design, by short circuiting components situated above their on-state voltage they can have an effective "filter action" for filtering out interference components in the control signal. This does not mean a filter action in the sense of a lowpass filter. Rather, the high-frequency components are short circuited when their amplitudes are in the signal component that is situated above the on-state voltage of the zener diode. "Cutting off" the components above the on-state voltage then also relates to the high-frequency components. The gate drive is therefore rendered independent of supply voltage modulations and control signal interference.

A class E converter regularly has a supply-side capacitor for stabilizing the supply voltage, usually an electrolytic capacitor. It is provided in one embodiment of the invention that each module has such a dedicated supply capacitor. In the case of another embodiment of the invention, however, these supply capacitors are replaced by a single capacitor provided for the entire series circuit. In the case of a third embodiment, the two cases are present in a mixed fashion, it being possible for the supply capacitors within the module to be designed in a correspondingly smaller fashion and, if possible, also to be designed as simple foil capacitors. Reference may be made to the exemplary embodiments by way of illustration.

Furthermore, capacitors that serve for voltage shaping are preferably also provided in parallel with the switching paths of the respective switching transistors in the modules.

A further refinement of the invention provides a capacitive short circuit of the taps of each module between the respective switching transistor and the respective storage inductor. This permits balancing of the AC voltage signals at the respective modules by means of a high-frequency short circuit. This avoids problems as a consequence of the secondary voltage distribution and influences via capacitive couplings. To be precise, there is no absolute need for the primary voltages at the switches and storage inductors to be the same. Rather, asymmetries occur as a consequence of capacitive couplings between the primary windings and secondary windings and from influences of the secondary-side interconnection. Such asymmetries are ruled out by the abovementioned high-frequency short circuit.

The output of the respective modules preferably has a transformer, the secondary windings of the transformers not necessarily having to be interconnected in series, but are, however, preferably so connected, as illustrated in the exemplary embodiments.

Preferred fields of application of the invention are to be found in the operation of dielectrically impeded discharge lamps, that is to say in the use of the converter circuit in an electronic ballast for such lamps. Furthermore, such lamp systems can be used, for example, in the backlighting of monitors for computers or television sets, or in other display devices. Also important are UV emitters, that is to say lamps in the case of which the original UV radiation from the discharge is utilized and no fluorescent substance is used or is converted into UV radiation of longer wavelengths by means of a suitable fluorescent substance. Such UV radiators are used for various technical tasks, in particular for materials handling, surface modification, for water purification and sterilization.

BRIEF DESCRIPTION OF THE DRAWINGS

The invention is explained in more detail below with the aid of the exemplary embodiments, in which case, as already set forth, the features are to be understood with regard to the various categories and aspects of the invention, and otherwise can also be essential to the invention in other combinations.

BEST MODE FOR CARRYING OUT THE INVENTION

Figure 1:
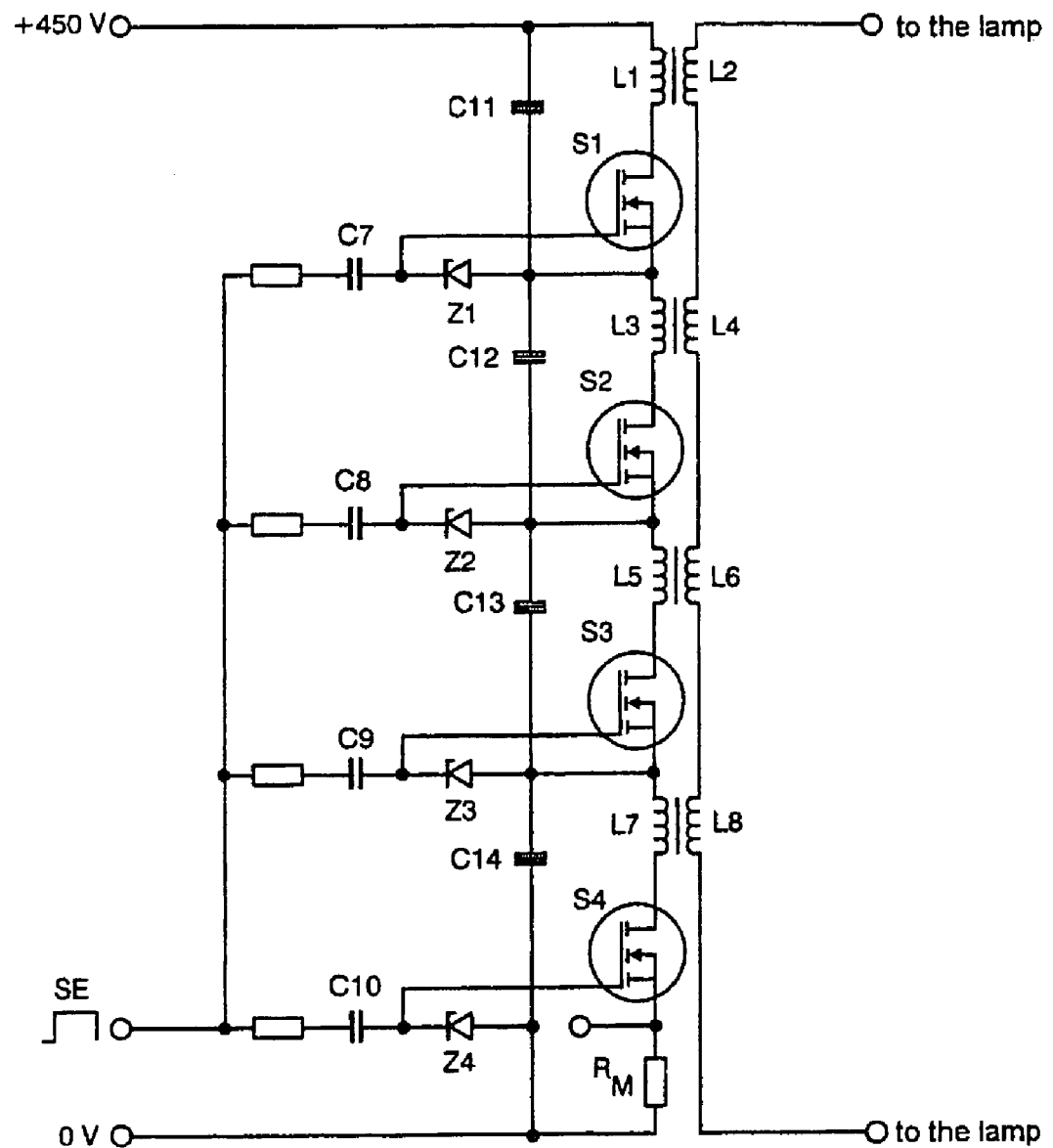
FIG. 1 shows a simple schematic example of a converter circuit according to the invention as a first exemplary embodiment.

FIG. 1 shows a series circuit of four class E converter modules in a ballast for the purpose of supplying a dielectrically impeded discharge lamp. A first module, which is depicted at the top in FIG. 1 and is at a high potential, has a switching transistor S1, here a power MOSFET, a storage inductor L1 with a secondary winding L2, a supply electrolytic capacitor 11, a drive coupling capacitor C7 and a zener diode Z1. The storage inductor L1 and the switching transistor S1 are connected in series, the source terminal of the switching transistor S1 being at the bottom at the reference potential inside the module, which forms the positive supply potential of the module (S2, L3, L4, C12, C8, Z2) situated therebelow.

The drain terminal of the switching transistor S1 is coupled to the lower terminal of the storage inductor L1, whose upper terminal is at an intermediate circuit DC voltage of approximately 450 V. This intermediate circuit supply voltage is generated in an inherently conventional way—not illustrated here in detail—by rectification and conversion with the aid of a step-up converter from a line supply voltage.

Lying in parallel with the series circuit composed of the storage inductor L1 and the switching transistor S1 is the supply capacitor C11 which serves to support the supply voltage and is therefore designed as a relatively large electrolytic capacitor.

A central control signal SE is fed in at bottom left in FIG. 1 and is illustrated here symbolically as a square-wave shape. This is applied, via resistors (not numbered) and drive coupling capacitors C7-C10, in the case of the upper module C7, to the gates of the switching transistors. Thus, the control signal is coupled in in terms purely of AC voltage. Connected between the gate terminal of the switching transistor S1 and the source terminal is a zener diode Z1 that adjusts the DC voltage level of the coupling capacitor C7 and prevents overvoltages at the gate terminal. In addition, by skillfully setting the incoupled drive signal level it is possible to achieve that in the case of an opening of the switching transistor S1 the drive signal is somewhat above the on-state voltage of the zener diode Z1, thus causing short circuiting of interference in the zener diode Z1 that is superposed on the drive signal. The resistors in the common drive line, that is to say the resistor to the left of the coupling capacitor C7, for example, are provided for this short circuit situation.

Located below the first module described is a second module of identical design and having components numbered in a correspondingly higher fashion, the internal (lower) reference potential of the first module forming the positive supply potential of the second module. Corresponding relationships hold for the second and third module and for the third and fourth module. As shown in FIG. 1, the internal reference potential of the fourth module is at frame potential, and is coupled to frame via a shunt $R_M$ in the case of the source terminal of the fourth switching transistor S4.

As in the case of a voltage divider circuit, the supply voltage of 450 V is distributed over the four supply capacitors C11-C14 such that each of the capacitors is charged to approximately 112.5 V. This is regarded as a favorable value because DC voltages in the range between 40 V and 120 V are typically favorable for operating class E converters used in operating dielectrically impeded discharge lamps. The individual module supply voltage could also be reduced by an appropriately higher number of modules.

There was a certain fear at first that material tolerances, in particular differing capacitances of the electrolytic capacitors C11-C14 and/or different inductances, would lead to substantially differing supply voltages of the individual modules as far as destruction of the components. However, it emerged that the fluctuations occurring are relatively slight and manageable, and that the circuit behaves in a stable fashion. The reason for this, in this instance, is that when an individual module supply voltage is raised the pulse energy converted by this module rises, and the corresponding supply capacitor is thereby discharged more strongly.

Moreover, in the case of the circuit illustrated in FIG. 1 it is not the drain-source voltages of the individual switching transistors S1-S4 that are added together. Rather, the individual drain-source voltage is added to the respective DC voltage level "therebelow" with reference to the circuit reference point, that is to say, for example, the drain-source voltage of the switching transistor S2 is added to the 225 V at the upper terminal of the capacitor C13. Thus, what is involved here is not a series circuit of individual switching transistors such as is known, for example, for the purpose of raising the total off-state voltage.

In addition to the voltage stabilization, the supply capacitors C11-C14 are also intended to absorb energy fed back from the secondary circuit into the primary circuit of the individual class E converter module. Reference is made to U.S. Pat. No. 6,323,600 B1 already cited. Otherwise, the mode of operation of class E converters is known to the person skilled in the art.

In this exemplary embodiment, the storage inductors are coupled to secondary windings L2, L4, L6 and L8 that form a series circuit, in turn. Thus, inductive voltages on the secondary side are also added together by the driving of the switching transistors S1-S4, which is temporally synchronized in accordance with FIG. 1.

The secondary-side inductors L2, L4, L6 and L8 could, of course, also be interconnected differently, for example they could be connected in parallel. This is a question of matching the impedance to the dielectrically impeded discharge lamp to be supplied. A series circuit is favorable in the present case, because the aim is to generate relatively high voltages. The serial output circuit is preferred chiefly because in the case of parallel circuits manufacturing tolerances can cause the flow of compensation currents which are disadvantageous with regard to the electromagnetic compatibility and to losses (so-called ringing). The powers of the individual modules add together in each case to form a total power.

The invention also has the further advantage in this case that more favorable design sizes, in particular design heights, can be attained in conjunction with relatively large required input powers of the lamp to be supplied owing to the distribution over a number of modules, in particular the distribution over a number of inductors and/or transformers. A number of small transformers are frequently more favorable in terms of design than a relatively large one.

Figure 2:
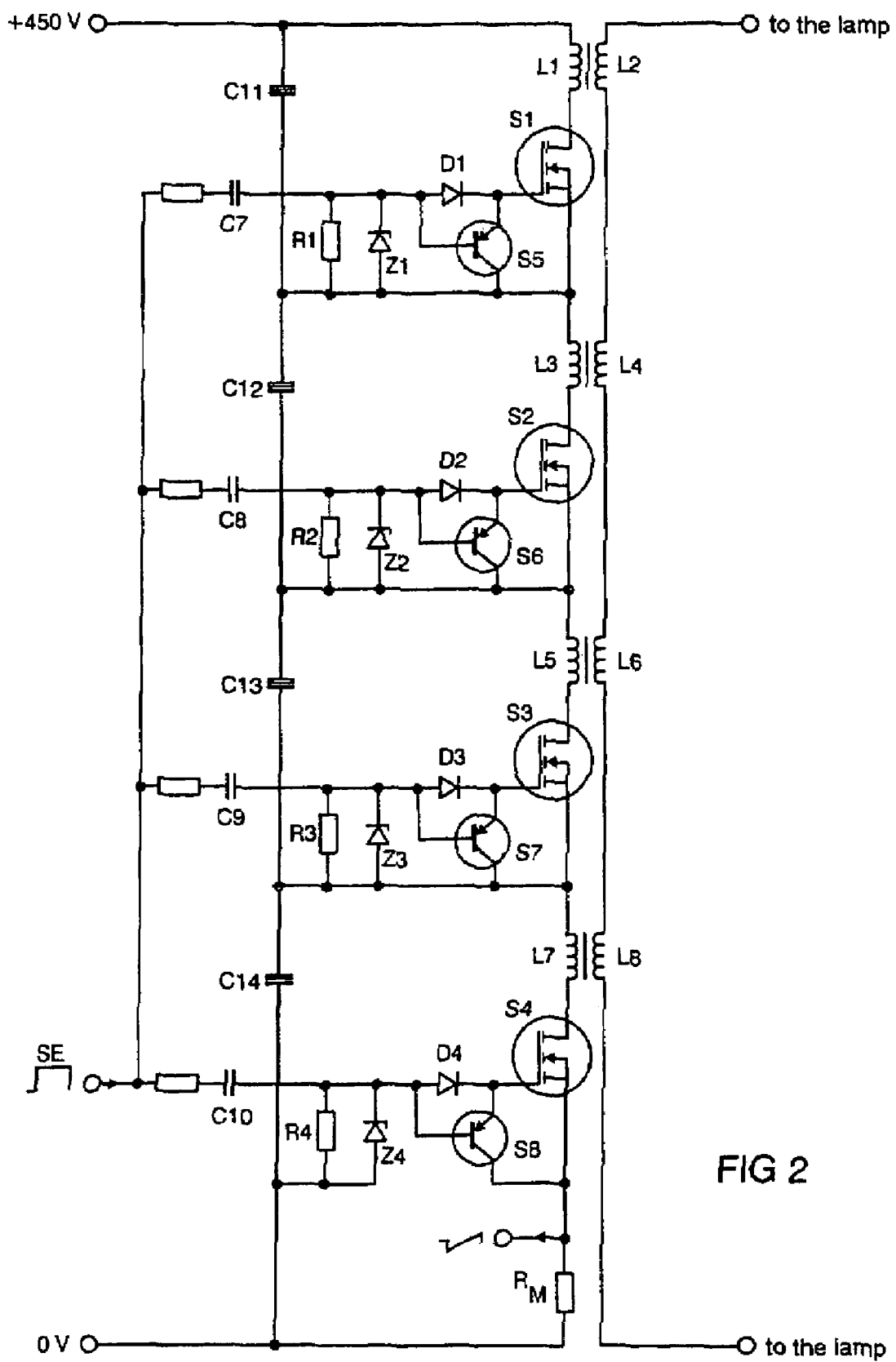
FIG. 2 shows a second exemplary embodiment of a converter circuit with a few additional features by comparison with the circuit from FIG. 1.

FIG. 2 shows a variant of FIG. 1.

FIG. 2 shows largely similar structures to that of FIG. 1, the same reference symbols also having been used for corresponding components. In addition, each module respectively includes between the upper terminal of the zener diode and the gate terminal of the switching transistor a rectifier diode connected with its anode to the cathode of the zener diode, and a bipolar transistor whose emitter is connected between this rectifier diode and the gate terminal, whose base is connected between the rectifier diode and the zener diode, and whose collector is connected to the source terminal of the respective switching transistor. The rectifier diodes are denoted by D1-D4, whereas the bipolar transistors are denoted by S5-S8. This interconnection ensures that the switching transistors S1-S4 can be switched off particularly quickly by guiding the potential at the gate terminal below the gate voltage threshold value particularly quickly via the emitter-collector path of the respective bipolar transistor S1-S8. The diodes D1-D4 ensure that the switching transistors S1-S4 can be switched off via the bipolar transistors S5-S8 and can be switched on via the diodes D1-D4.

Furthermore, the resistors denoted by R1-R4 and which are in parallel with the zener diodes ensure that the entire series circuit of the class E converter modules switches off automatically without a drive signal SE.

Figure 3:
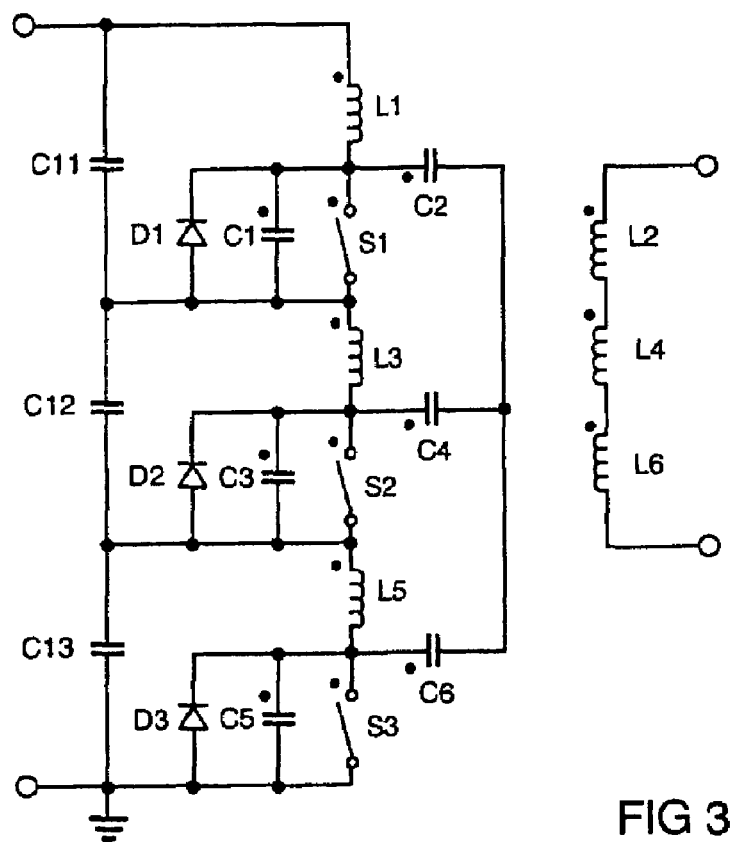
FIG. 3 shows a third exemplary embodiment of a converter circuit.

FIG. 3 shows a third exemplary embodiment which differs from the two previous exemplary embodiments firstly in that only three modules are used. Furthermore, here the primary and secondary windings of the transformers L1 and L2, L3 and L4, L5 and L6 are drawn separately from one another, this being intended only to serve clarity in the figure and not signifying any technical changes as against FIGS. 1 and 2. Finally, the driving of the switching transistors S1-S3, which is performed in accordance with FIG. 2, is omitted here.

Firstly, additional capacitors C1, C3 and C5 are respectively provided in parallel with the switching transistors S1, S2 and S3, which serve for signal shaping via the transistors. The rectifier diodes D1-D3 depicted in parallel therewith constitute the intrinsic body diodes of the switching transistors S1-S3. When use is made not of MOSFETs but of bipolar transistors, for example, it would then be necessary for such separate diodes to be used.

Furthermore, taps are short circuited between the storage inductors L1, L3 and L5 and the respectively associated switching transistors S1, S2 and S3 via coupling capacitors C2, C4 and C6. This high-frequency short circuit balances the AC voltage signals and thereby guards against problems that can occur because of the secondary voltage distribution and capacitive couplings.

Figure 4:
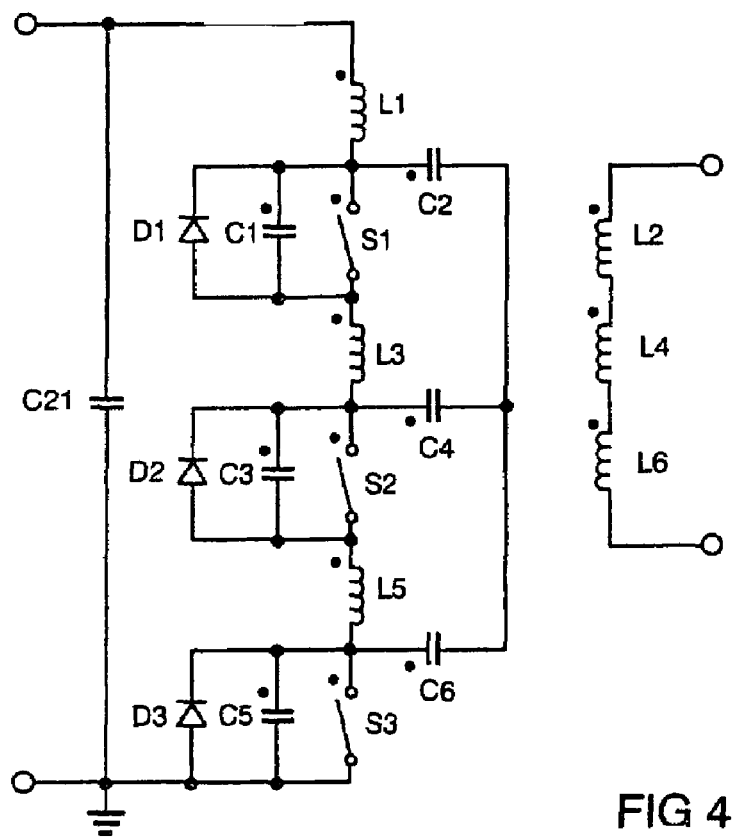
FIG. 4 shows a fourth exemplary embodiment of a converter circuit.

Finally, FIG. 4 shows a fourth exemplary embodiment, which corresponds to the third exemplary embodiment from FIG. 3 with the following exception: the supply capacitors C11, C12 and C13 of the individual class E converter modules are replaced by a single supply capacitor C21 that is situated in parallel with the entire series circuit. Such a large electrolytic capacitor is generally more cost effective than a number of small ones.

An advantageous embodiment can also consist in a combination of FIGS. 3 and 4 to the effect that a relatively large common storage capacitor C21 is used together with relatively small storage capacitors C11, C12 and C13 in the individual modules, that is to say a total of four capacitors for the present three modules. Because of the component costs, this solution would be even more favorable than the solution in accordance with FIGS. 1-3, which is based exclusively on the individual modules. In particular, foil capacitors can be used for the storage capacitors of the individual modules.

Overall, the invention shows a high degree of flexibility owing to a simple modular design by virtue of the fact that optimized class E converter modules can be assembled depending on the available DC voltage supply. It is possible to undertake matching to the lamp to be supplied on the secondary side as well by means of suitable interconnection (in serial or parallel terms). The necessity for an interposed further converter in order to reduce the DC voltage level of the output of the step-up converter is eliminated. Instead of this, the converter circuit in accordance with FIGS. 1-4 can be operated directly at the output of the step-up converter. Finally, the division into a number of storage inductors and/or transformers also offers a large degree of spatial flexibility in the individual case, in particular a favorable design height.

The invention is particularly suitable for supplying dielectrically impeded discharge lamps, for example for backlighting of monitors, specifically particularly in the case of relatively high lamp powers (for example in the case of large-format TV screens).

What is claimed is:

1. A converter circuit having a plurality of class E converter modules whose switching transistors and storage inductors are connected in series overall and whose switching transistors can be driven by a common control signal, individual control lines of the respective switching transistors of the class E converter modules are coupled to a common control line via respective capacitors in order to transmit the common control signal.

2. The converter circuit as claimed in claim 1, in which the class E converter modules have a transformer as output in each case.

3. The converter circuit as claimed in claim 1, having a respective zener diode in each class E converter module between a control terminal and a reference potential terminal of the switching transistor of the respective module.

4. The converter circuit as claimed in claim 1, in which each class E converter module has a dedicated supply capacitor.

5. The converter circuit as claimed in claim 1, in which the entire series circuit of the class E converter modules has a common supply capacitor.

6. The converter circuit as claimed in claim 1, in which a capacitor is connected in parallel in each case in the respective class E converter modules with the switching path of the respective switching transistor.

7. The converter circuit as claimed in claim 1, in which respective taps between the respective switching transistor and the respective storage inductor of the class E converter modules are short circuited with one another capacitively.

8. The converter circuit as claimed in claim 1, in which the class E converter modules have a transformer as output in each case.

9. The converter circuit as claimed in claim 1, in which respective taps between the respective switching transistor and the respective storage inductor of the class E converter modules are short circuited with one another capacitively.

10. The converter circuit as claimed in claim 1, in which a capacitor is connected in parallel in each case in the respective class E converter modules with the switching path of the respective switching transistor.

11. The converter circuit as claimed in claim 1, in which the entire series circuit of the class E converter modules has a common supply capacitor.

12. A method for operating a converter circuit as claimed in claim 1, in which the switching transistors are driven synchronously via the common control line, the storage inductors of the class E converter modules are charged and discharged in a temporally synchronized fashion, and a common load is driven jointly by the class E converter modules at the output of the converter circuit.

13. An electronic ballast for a dielectrically impeded discharge lamp having a converter circuit as claimed in claim 1.

14. A lamp system having an electronic ballast as claimed in claim 13 and a dielectrically impeded discharge lamp which can be operated with the ballast.

15. The use of a lamp system as claimed in claim 14 for background lighting in a monitor, television screen or a display device, for the purpose of illumination in a luminaire, or of UV treatment in an industrial UV radiator.

16. A display device, in particular a monitor or television screen having a lamp system as claimed in claim 14 for background lighting.

17. The converter circuit as claimed in claim 1, having a respective zener diode in each class E converter module between a control terminal and a reference potential terminal of the switching transistor of the respective module.

18. The converter circuit as claimed in claim 1, in which each class E converter module has a dedicated supply capacitor.

* * * * *